United States Patent
Wu et al.

(10) Patent No.: US 8,977,061 B2
(45) Date of Patent: Mar. 10, 2015

(54) MERGING FACE CLUSTERS

(75) Inventors: Peng Wu, San Jose, CA (US); Feng Tang, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 911 days.

(21) Appl. No.: 13/167,407

(22) Filed: Jun. 23, 2011

(65) Prior Publication Data

US 2012/0328167 A1    Dec. 27, 2012

(51) Int. Cl.
 *G06K 9/62* (2006.01)
 *G06K 9/00* (2006.01)

(52) U.S. Cl.
 CPC .................................. *G06K 9/00677* (2013.01)
 USPC ........... 382/225; 382/115; 382/116; 382/117; 382/118

(58) Field of Classification Search
 None
 See application file for complete search history.

(56) References Cited

U.S. PATENT DOCUMENTS

| 2006/0251292 | A1 | 11/2006 | Gokturk et al. |
| 2007/0237364 | A1 | 10/2007 | Song et al. |
| 2008/0089561 | A1 | 4/2008 | Zhang |
| 2008/0298766 | A1 | 12/2008 | Wen et al. |
| 2009/0192967 | A1 | 7/2009 | Luo et al. |
| 2009/0292549 | A1 | 11/2009 | Ma et al. |
| 2010/0066822 | A1 | 3/2010 | Steinberg et al. |
| 2010/0226584 | A1* | 9/2010 | Weng et al. ................... 382/225 |

OTHER PUBLICATIONS

Yi-Fan Zhang, et al.; "Character Identification in Feature-Length Films Using Global Face-Name Matching"; Nov. 2009; pp. 1276-1288; vol. 11; http://www.nlpr.ia.ac.cn/2009papers/gjkw/gk32.pdf.
Ming Zhao, et al.; "Automatic Person Annotation of Family Photo Album"; 2006; pp. 163-172; http://nichol.as/papers/ZHAO/Automatic%20Person%20Annotation%20of%20Family%20Photo.pdf.
Nikolaos Mavridis; et al.; "Friends with Faces: How Social Networks Can Enhance Face Recognition and Vice Versa"; 2010; <http://www.dr-nikolaos-mavridis.com/resources/snfr_bchap.pdf.

* cited by examiner

*Primary Examiner* — Jayesh A Patel
(74) *Attorney, Agent, or Firm* — VanCott, Bagley, Cornwell; Steven L Nichols (57) ABSTRACT

A method for merging face clusters includes analyzing a set of digital images, grouping instances of faces within the set of digital images into a set of face clusters, each of the face clusters corresponding to a particular person, and determining a probability that a person associated with a first face cluster from the set of face clusters is the same person associated with a second face cluster of the set of face clusters. The probability is based on both a social similarity between the first face cluster and the second face cluster in addition to a facial similarity between the first face cluster and the second face cluster.

20 Claims, 6 Drawing Sheets

MERGING FACE CLUSTERS

BACKGROUND

Many software applications exist that can automatically find faces within a collection of photos. These software applications may also group these faces according to the person to which they belong. Specifically, a facial recognition function can group similar faces together. A group of faces from a photo collection that is determined to belong to the same person is referred to as a face cluster.

Facial recognition functions may not be completely accurate. This is because different photos of the same person may show that person at different angles and with different lighting. Thus, a particular face cluster with a relatively small number of instances may actually be associated with a person of a relatively large face cluster. Thus, the smaller face cluster should be merged with the larger face cluster. A user may often manually go through several face clusters to determine which, if any, should be merged. This task can be time consuming.

BRIEF DESCRIPTION OF THE DRAWINGS

The accompanying drawings illustrate various examples of the principles described herein and are a part of the specification. The drawings are merely examples and do not limit the scope of the claims.

Throughout the drawings, identical reference numbers designate similar, but not necessarily identical, elements.

DETAILED DESCRIPTION

As mentioned above, facial recognition functions may not be completely accurate. This is because different photos of the same person may show that person at different angles and with different lighting. Thus, a particular face cluster with a relatively small number of instances may actually be associated with a person of a relatively large face cluster. Thus, the smaller face cluster should be merged with the larger face cluster. A user may often manually go through several face clusters to determine which, if any, should be merged. This task can be time consuming.

In light of this and other issues, the present specification discloses methods and systems to simplify the user's task of going through a collection of face clusters and determining which of those face clusters, if any, should be merged with another face cluster. Specifically, for a particular face cluster, the user is provided with a list of other face clusters for which there is a high probability that those face clusters correspond to the same person associated with that particular face cluster. A face cluster has a high probability of being merged with another face cluster if there is both a facial similarity between the two face clusters and a social closeness similarity between the two face clusters.

Social closeness refers to the social connections of a person corresponding to a particular face cluster. By analyzing the faces of persons who co-appear in a photograph of a particular person, a social graph can be constructed. The social graph indicates which people a person regularly co-appears with. These people can thus be more strongly socially connected to that person. If two face clusters have a high similarity of social connections, then it is more likely that those two face clusters are the same person.

According to certain illustrative examples, face clusters from a set of photos are grouped into two sets of face clusters. The first set of face clusters includes those with a larger number of face instances. This set is referred to as the known set. The second set of face clusters includes those with a relatively small number of face instances. This set is referred to as the unknown set. The face clusters within the unknown set are more likely to correspond to a person associated with one of the face clusters within the known set. Thus, for a particular face cluster within the unknown set, which is referred to as a selected face cluster, the face clustering system determines which face clusters from the known set, if any, with which the selected face cluster should be merged.

A face cluster within the unknown set should be merged with one of the face clusters from the known set if the two face clusters have both facial similarity and social closeness similarity. In one example, to determine the face clusters within the known set which are socially similar to a selected face cluster within the unknown set, the face clustering system determines the persons who have co-appeared with the person of the selected face cluster. If any of the people of the face clusters within the known set correspond to the co-appearing persons, then the face clusters of those persons form an intermediate set. This intermediate set can thus be a subset of the known set. Face clusters that are in the known set but not within the intermediate set are placed into a candidate set.

The system determines the social connections of each of the persons corresponding to face clusters within the intermediate set. The system considers the social connections to face clusters within the candidate set. If there is a face cluster within the candidate set that is socially connected to each of the face clusters within the intermediate set, then that face cluster is placed into a socially similar set. If there is a facial similarity between the selected face cluster and any of the face clusters within the socially similar set, then those face clusters are determined to have a high likelihood of being the same person. The face cluster merging system presents the potentially similar face clusters to the user as a possibility that they should be merged.

Through use of methods and systems embodying principles described herein, a user is able to go through face clusters having a smaller number of face instances and, for each of those face clusters, have the face clustering system recommend a list of larger face clusters with which that face cluster should be merged. Thus, the user does not have to manually go through each face cluster and visually inspect the faces within those clusters to determine which, if any, should be merged.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Figure 1:
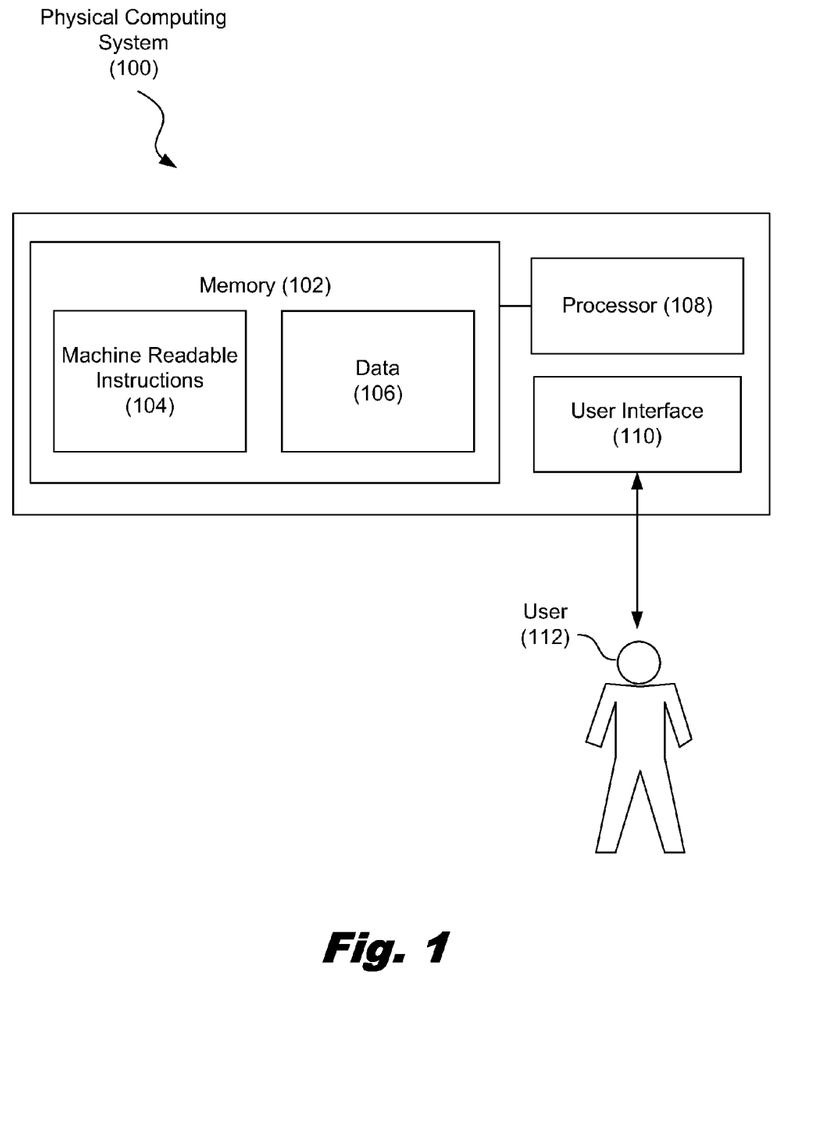
FIG. 1 is a diagram showing an illustrative physical computing system, according to one example of principles described herein.

Referring now to the figures, FIG. 1 is a diagram showing an illustrative physical computing system (100) that may be used to run applications to perform face clustering, including but not limited to, software applications. According to certain illustrative examples, the physical computing system (100) includes a memory (102) having machine readable instructions 104 (including but not limited to software) and data (106) stored thereon. The physical computing system (100) also includes a processor (108) and a user interface (110).

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of machine readable instructions 104 (including but not limited to software) and data (106).

The physical computing system (100) also includes a processor (108) for executing the machine readable instructions (104) (including but not limited to software) and using or updating the data (106) stored in memory (102). The machine readable instructions (104) (including but not limited to software) may include an operating system. An operating system allows other applications to interact properly with the hardware of the physical computing system. Such other applications may include machine readable instructions, such as but not limited to software, for photo management and face clustering for grouping face found within digital photos.

A user interface (110) may provide a means for the user (112) to interact with the physical computing system (100). The user interface may include any collection of devices for interfacing with a human user (112). For example, the user interface (110) may include an input device such as a keyboard or mouse and an output device such as a monitor.

Figure 2:
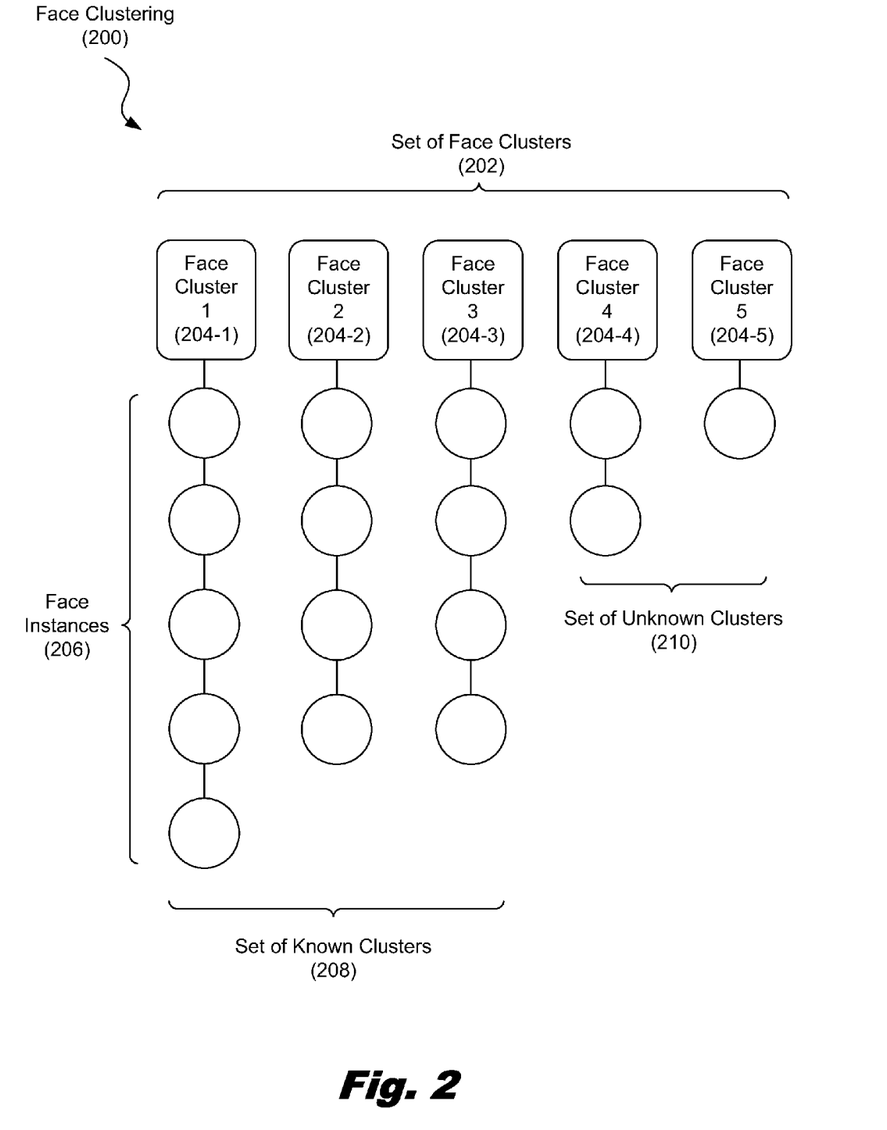
FIG. 2 is a diagram showing illustrative face clustering, according to one example of principles described herein.

FIG. 2 is a diagram showing illustrative face clustering (200). According to certain illustrative examples, a face clustering system can find several faces within a collection of digital photos. These faces are grouped according to the person to whom they belong. Various facial recognition functions can be used to determine which face instances belong to the same person.

A group of faces belonging to the same person is referred to as a face cluster (204). By analyzing a collection of digital photos and grouping the faces found therein, a set of face clusters (202) can be formed. Each of these face clusters (204) have a number of face instances (206). In the example shown in FIG. 2, face cluster 1 (204-1) includes five faces, face cluster 2 (204-2) and face cluster 3 (204-3) include four faces, face cluster 4 (204-4) includes two faces and face cluster 5 (204-5) includes one face instance.

However, as mentioned above, these facial recognition functions are not always completely accurate. It may be the case that a particular face cluster is actually associated with a person represented by a different face cluster. For example, it may be the case that the face instance in face cluster 5 (204-5) belongs to the same person associated with face cluster 2 (204-2). Typically, smaller face clusters are more likely to be associated with a person of a larger face cluster. Thus, the set of face clusters (202) can be divided into a set of known clusters (208) and a set of unknown clusters.

A face cluster (204) may be placed into the known set of face clusters (208) for a variety of reasons. In one case, a face cluster may be placed into the set of known clusters if it includes more than a threshold number of face instances. Alternatively, a face cluster may be placed into the known set of face clusters (208) if the facial recognition function has determined that there is a highly probable fit between the faces within that cluster. In one case, a face cluster is placed into the known set of clusters if a human user has viewed the faces within that cluster and has confirmed the fit and identified the individual whose faces are within that cluster. Any face clusters that are not placed within the known set of face clusters (208) are placed within the unknown set of face clusters (210).

The face clusters (204) within the unknown set of face clusters (210) may correspond to a person who has been identified within the known set of face clusters. It may be the case that the facial recognition function placed these faces into a different face cluster. This is because these photos of the same person may have been taken at a different angle or with different lighting. Such face clusters should then be merged with the appropriate face cluster within the known set of face clusters (208). However, it may be the case that a face cluster within the set of unknown face clusters (210) is simply a person who does not appear very many times within the collection of digital photos. In such cases, that face cluster may not be merged with another face cluster.

Figure 3:
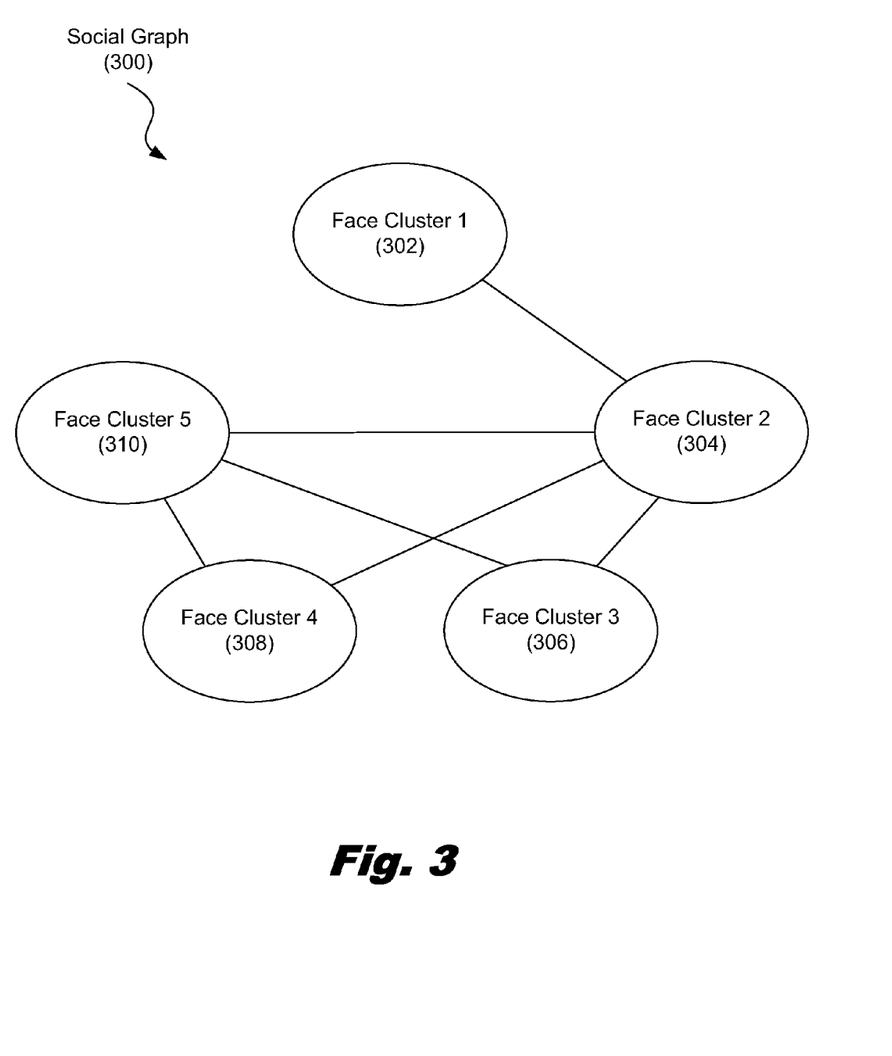
FIG. 3 is a diagram showing an illustrative social graph, according to one example of principles described herein.

FIG. 3 is a diagram showing an illustrative social graph (300). As mentioned above, the face clustering system takes into account social similarity when making recommendations as to whether two face clusters should be merged. Social similarity can be determined by analyzing the faces which co-appear together in a collection of photos. Various functions can be used to construct a social graph based on this analysis. Such functions are beyond the scope of this specification and thus a detailed description of such functions is not provided here.

FIG. 3 illustrates a simple social graph that includes five face clusters, each face cluster representing a single person. The lines between the face clusters indicate social connections between the people represented by the face clusters. Face cluster 1 (302) is socially connected to face cluster 2 (304). Face cluster 2 (304) is also socially connected to face cluster 3 (306), face cluster 4 (308), and face cluster 5 (310). Face cluster 5 (310) is also socially connected to face cluster 4 (308) and face cluster 3 (306). The social graph (300) illustrated here is a simple example. A practical social graph embodying principles described herein may have a much larger number of face clusters with more complex social connections.

Figure 4:
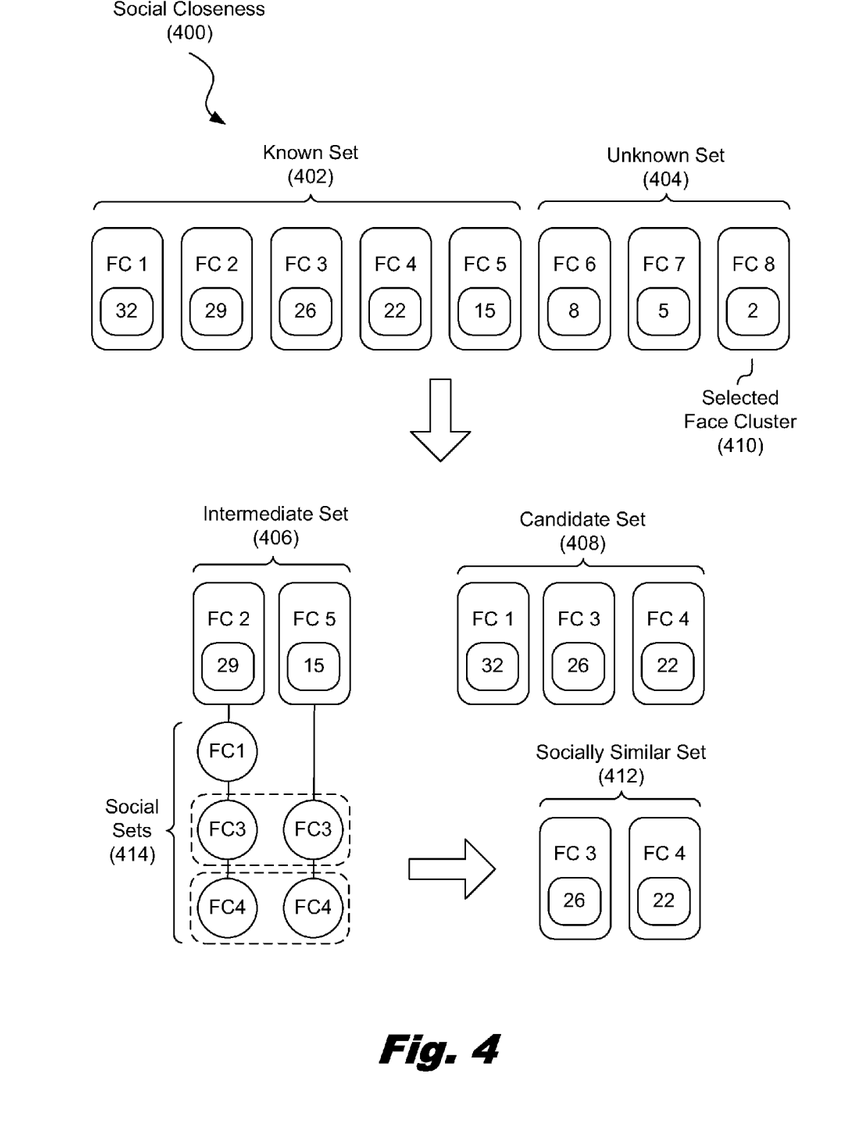
FIG. 4 is a diagram showing illustrative social closeness, according to one example of principles described herein.

FIG. 4 is a diagram showing illustrative social closeness. As mentioned above, a face cluster from the set of unknown face clusters should be merged with a face cluster within the set of known clusters if those face clusters are both facially similar and socially similar. The following describes how it is determined which face clusters within the set of known face clusters are socially similar to a face cluster within the set of unknown face clusters.

As mentioned above, the entire set of face clusters is divided into a known set (402) and an unknown set (404). FIG. 4 illustrates each face cluster with a number indicating how many face instances are within that face cluster. For example, face cluster 1 has a total of 32 faces and face cluster 8 has a total of 2 faces. The numbers shown in FIG. 4 are for illustrative purposes only and are not necessarily indicative of typical numbers that would be present when using a system embodying principles described herein.

According to certain illustrative examples, for each face cluster within the unknown set (404), the face clustering system determines which, if any, face clusters from the known set (402) are socially similar to that face cluster. The face cluster that is being considered is referred to as the selected face cluster (410). In the example shown in FIG. 4, face cluster 8 is the selected face cluster (410).

The face clustering system identifies each of the faces that co-appeared with the person of the selected face cluster (410). Face cluster 8 has two face instances. Thus, there are two photos within the photo collection that include the face of the person associated with face cluster 8. The face clustering system determines if any of the faces that co-appear with the face of the selected face cluster correspond to faces within the known set. Each person that both co-appears with the person of the selected face cluster and is also associated with a face cluster within the known set (402) is placed within an intermediate set (406). The face clusters within the known set (402) that are not within the intermediate set (406) are then placed into a candidate set (408).

The face clustering system determines the social connections of each of the persons associated with the face clusters within the intermediate set (406). The social connections of a face cluster can be determined through use of social graphing functions. These social graphing functions define social clusters based on groups of face clusters. For example, a particular set of people may regularly appear in photos together. These people would then be placed within a social cluster. Various social graphs can be constructed that indicate how persons are socially connected to one another. The face clustering system can use these social graphs to determine if a particular face cluster from the unknown set has similar social connections a face cluster within the known set (402). If two face clusters have similar social connections as well as facial similarity, then it is more likely that the two face clusters should be merged.

Each face cluster within the intermediate set (406) can be assigned a social set (414) of face clusters that indicate with which face clusters from the candidate set which that face cluster is socially connected. In the example of FIG. 4, the person associated with face cluster 2 is socially connected to the people associated with face clusters 1, 3, and 4. Additionally, the person associated with face cluster 5 is socially connected to the people associated with face clusters 3 and 4. The face clustering system can then determine which of the face clusters within the social sets for each of the face clusters within the intermediate set are common to each of the social sets (414). In set theory, this is referred to as an intersection of each of the social sets.

In this example, face clusters 3 and 4 are common to both of the face clusters within the intermediate set (406). Thus, face clusters 3 and 4 are placed into a socially similar set (412). The socially similar set (412) indicates all of the face clusters within the known set (402) which are socially similar to the selected face cluster (410) within the unknown set (404).

In order to determine if any of the face clusters within the socially similar set (412) should be presented to the user as a potential face cluster to be merged with the selected face cluster (410), the face clustering system also factors in facial similarity. Various facial recognition functions may be applied to faces to determine the similarity of those faces. Such functions are beyond the scope of this application and thus a detailed discussion of such functions is not provided here.

If, for example, face cluster 3 is facially similar to the selected face cluster (410), then face cluster 3 is recommended to the user as a potential face cluster with which the selected face cluster (410) should be merged. It may be the case that no face clusters within the socially similar set (412) are facially similar to the selected face cluster (410). This is most likely the case if the selected face cluster is simply a person that does not appear very often in the collection of digital photos and does not need to be merged with another face cluster.

In some cases, there may be no face clusters within the social sets (314) that are common to each of the face clusters within the intermediate set (306). In such cases, the face clustering system can reduce the face clusters within the intermediate set that are considered for determining the socially similar set (312). The number of social sets (314) can be reduced one by one until there is at least one face cluster common to each of the remaining social sets (314).

In one example, the probability that a selected face cluster (410) should be merged with a face cluster from the known set (402) can be defined as follows:

$$P(FC_8|FC_3) = P_S(FC_8|FC_3) * P_F(FC_8|FC_3) \quad \text{(Equation 1)}$$

Where:
$P(FC_8|FC_3)$ is the probability that face cluster 8 should be merged with face cluster 3;
$P_S(FC_8|FC_3)$ is the probability that face cluster 8 is socially similar to face cluster 3; and
$P_F(FC_8|FC_3)$ is the probability that face cluster 8 is a facial fit to face cluster 3.

The probability function that describes social similarity between face cluster 8 and face cluster 3 may be a delta function. A delta function is one that results in either a '1' or a '0'. Thus, in this example, $P_S(FC_8|FC_3)$ would be 1 because face cluster 3 is within the socially similar set (312) when face cluster 8 is the selected face cluster (310). If face cluster 3 were not within the socially similar set (312), then $P_S(FC_8|FC_3)$ would be '0'.

Figure 5:
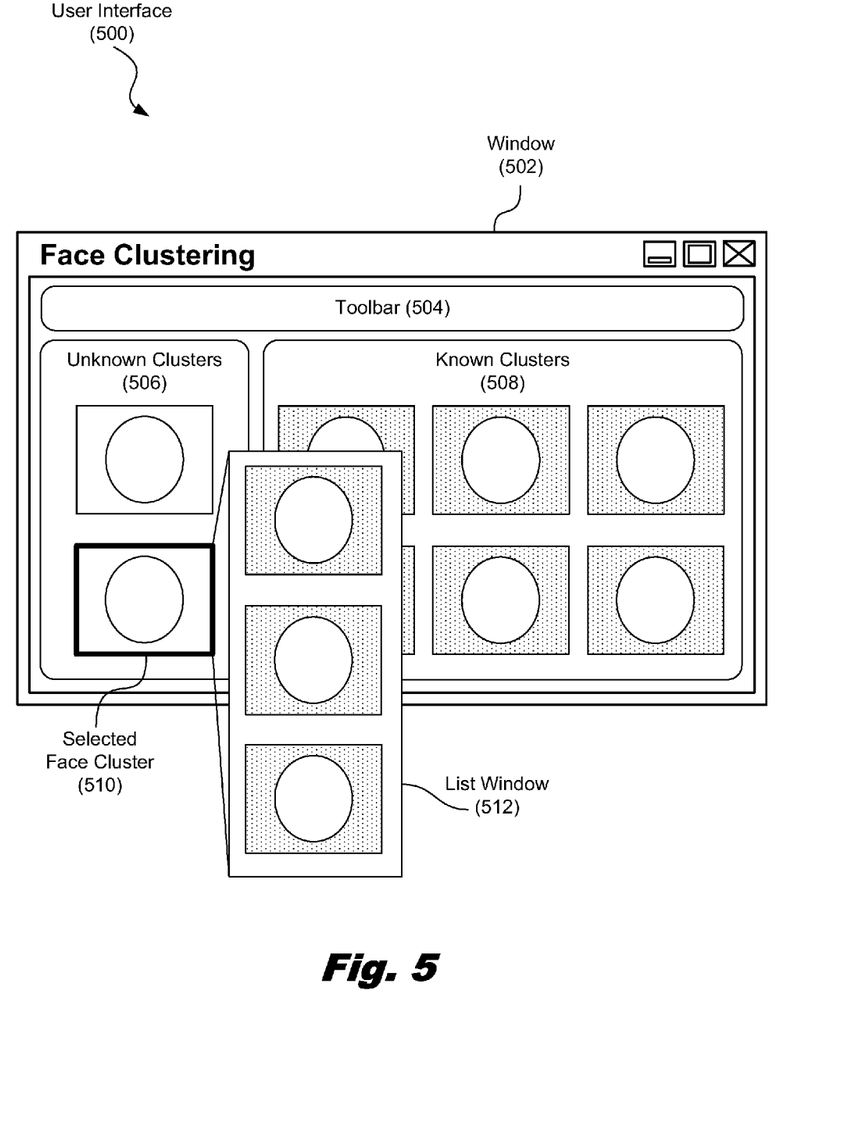
FIG. 5 is a diagram showing an illustrative user interface, according to one example of principles described herein.

FIG. 5 is a diagram showing an illustrative user interface (500) for a face clustering system. According to certain illustrative examples, the user interface (500) may be embodied as a window (502). The window (502) may include a toolbar (504) to provide the user with various tools and settings for the face clustering application. Additionally, the window (502) may display to the user, the unknown face clusters (506) and the known face clusters (508).

The user may then go through the unknown face clusters (506) and determine if they should be merged with any of the face clusters within the set of known face clusters (508). According to certain illustrative examples, the user may select one of the face clusters within the set of unknown face clusters (506) using an input device such as a mouse, trackpad, or touchscreen. When the user selects a particular face cluster (510), the face clustering system may then cause an additional window to appear. This additional window, which is referred to as the list window (512), may display a list of possible merging choices. The face clusters within this list window (502) are the ones that are both within the socially similar set (e.g. 412, FIG. 4) and are facially similar to the selected face cluster (512). If the user decides that any of the face clusters within the list window are associated with the same person that is associated with the selected face cluster, then the user can cause the system to merge those two face clusters.

Figure 6:
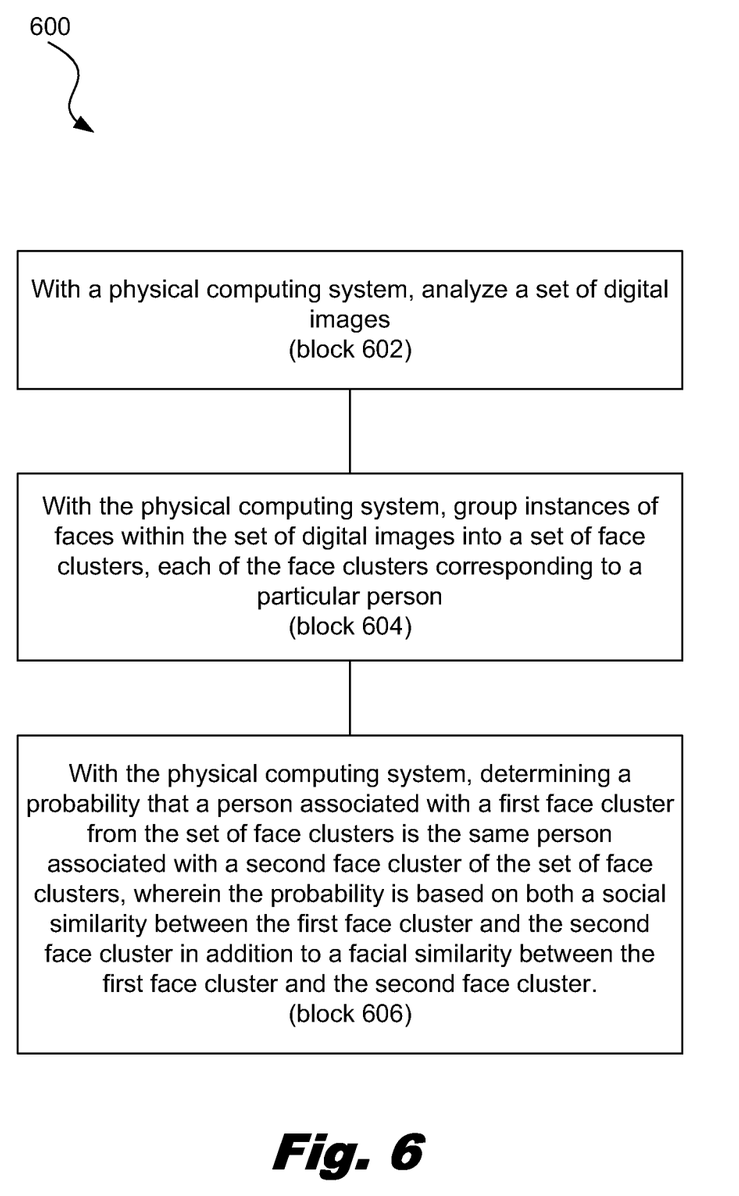
FIG. 6 is a flowchart showing an illustrative method for merging face clusters, according to one example of principles described herein.

FIG. 6 is a flowchart showing an illustrative method for merging face clusters. According to certain illustrative examples, the method includes, with a physical computing system, analyzing (block 602) a set of digital images, with the physical computing system, grouping (block 604) instances of faces within the set of digital images into a set of face clusters, each of the face clusters corresponding to a particular person, and with said physical computing system, determining (block 606) a probability that a person associated with a first face cluster from the set of face clusters is the same person associated with a second face cluster of the set of face clusters. The probability is based on both a social similarity between the first face cluster and the second face cluster in addition to a facial similarity between the first face cluster and the second face cluster.

In conclusion, through use of methods and systems embodying principles described herein, a user is able to go through face clusters having a smaller number of face instances and, for each of those face clusters, have the face clustering system recommend a list of larger face clusters with which that face cluster should be merged. Thus, the user does not have to manually go through each face cluster and visually inspect the faces within those clusters to determine which, if any, should be merged.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for merging face clusters, the method comprising:
    with a physical computing system, analyzing a set of digital images;
    with said physical computing system, grouping instances of faces within said set of digital images into a set of face clusters, each of said face clusters corresponding to a particular person; and
    with said physical computing system, determining a probability that a person associated with a first face cluster from said set of face clusters is the same person associated with a second face cluster of said set of face clusters, in which the first face cluster is part of an unknown set of face clusters and the second face cluster is part of a known set of face clusters;
    wherein said probability is based on both a social similarity between said first face cluster and said second face cluster and a facial similarity between said first face cluster and said second face cluster.

2. The method of claim 1, further comprising, with said physical computing system, making a recommendation to a user that said first and second face clusters should be merged if said probability is above a threshold level.

3. The method of claim 1, further comprising, providing a user with a list of additional face clusters with which said first face clusters should be merged with, each of said face clusters within said list having a high probability of being associated with the same person that is associated with said first face cluster based on both facial similarity and social similarity.

4. The method of claim 1, wherein said social similarity is determined by:
    determining a number of persons co-appearing within images that comprise said person associated with said first face cluster;
    forming an intermediate set of face clusters corresponding to said co-appearing persons; and
    for each face cluster within said intermediate set, determining a number of non-appearing face clusters that are socially connected to that face cluster;
    wherein, a face cluster socially connected to at least a threshold number of face clusters within said intermediate set is determined to be socially similar to said first face cluster.

5. The method of claim 4, wherein it is determined whether a face cluster is socially connected to another face cluster based on a social graph.

6. The method of claim 4, further comprising, iteratively reducing said threshold number by one face cluster until there is at least one non-appearing face cluster socially connected to each face cluster within said intermediate set.

7. The method of claim 1, wherein said facial similarity is determined through use of a facial recognition function applied to face instances within said first face cluster and faces within said second face cluster.

8. The method of claim 1, wherein said first face cluster is within a first subset of said set of face clusters and said second face cluster is within a second subset of said set of face clusters, said first subset including face clusters with a smaller number of face instances than face clusters within said second subset.

9. A computing system comprising:
    at least one processor;
    a memory communicatively coupled to the at least one processor, the memory comprising computer executable code that, when executed by the at least one processor, causes the at least one processor to:
    analyze a set of digital images;
    group instances of faces within said set of digital images into a set of face clusters, each of said face clusters corresponding to a particular person; and
    determine a probability that a person associated with a first face cluster from said set of face clusters is the same person associated with a second face cluster of said set of face clusters, in which the first face cluster is part of an unknown set of face clusters and the second face cluster is part of a known set of face clusters;
    wherein said probability is based on both a social similarity between said first face cluster and said second face cluster in addition to a facial similarity between said first face cluster and said second face cluster, in which social similarity is determined from a social graph.

10. The system of claim 9, further comprising, with said physical computing system, making a recommendation to a user that said first and second face clusters should be merged if said probability is above a threshold level.

11. The system of claim 9, wherein to determine said social similarity, said computer executable causes the at least one processor to:
    determine a number of persons co-appearing within images that comprise said person associated with said first face cluster;
    form an intermediate set of face clusters corresponding to said co-appearing persons; and
    for each face cluster within said intermediate set, determine a number of non-appearing face clusters that are socially connected to that face cluster;
    wherein, a face cluster socially connected to at least a threshold number of face clusters within said intermediate set is determined to be socially similar to said first face cluster.

12. The system of claim 11, wherein it is determined whether a face cluster is socially connected to another face cluster based on a social graph.

13. The system of claim 11, wherein to determine said social similarity, said computer executable causes the at least one processor to iteratively reduce said threshold number by one face cluster until there is at least one non-appearing face cluster socially connected to each face cluster within said intermediate set.

14. The system of claim 9, wherein said first face cluster is within a first subset of said set of face clusters and said second face cluster is within a second subset of said set of face clusters, said first subset including face clusters with a smaller number of face instances than face clusters within said second subset.

15. A method for merging face clusters, the method comprising:
- with a physical computing system, analyzing a set of digital images;
- with said physical computing system, grouping instances of faces within said set of digital images into a set of face clusters, each of said face clusters corresponding to a particular person;
- with said physical computing system, determining a social similarity between a first face cluster and one of a number of other face clusters by:
  - determining a number of persons co-appearing within images that comprise a person associated with said first face cluster;
  - forming an intermediate set of face clusters corresponding to said co-appearing persons; and
  - for each face cluster within said intermediate set, determining a number of non-appearing face clusters that are socially connected to that face cluster;
- with said physical computing system, determining a probability that said person associated with said first face cluster from said set of face clusters is the same person associated with said one of said number of other face clusters within said set of face clusters, said probability is based on both a facial similarity and said social similarity between said first face cluster and said one of said number of other face clusters; and
- with said physical computing system, providing to a user, a list comprising a subset of said other face clusters, each of said face clusters within said list having said probability higher than a threshold level.

16. The method of claim 1, further comprising displaying a number of unknown face clusters and a number of known face clusters.

17. The method of claim 1, wherein said probability is calculated by multiplying a probability that said first face cluster is socially similar to said second cluster by a probability that said first face cluster is facially similar to said second cluster.

18. The method of claim 1, wherein said social similarity is determined based on a candidate set of face clusters that are not within an intermediate set, the intermediate set including faces that co-appear with said person associated with said first face cluster.

19. The method of claim 1, in which said known set of face clusters includes face clusters having at least a threshold number of face instances.

20. The method of claim 3, in which said list of additional face clusters is provided upon selection of said first face cluster via an input device.

* * * * *